United States Patent
Chan et al.

(10) Patent No.: US 10,717,444 B1
(45) Date of Patent: *Jul. 21, 2020

(54) TECHNOLOGY FOR ASSESSING EMOTIONAL STATE OF VEHICLE OPERATOR

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,226

(22) Filed: Mar. 4, 2019

Related U.S. Application Data

(63) Continuation of application No. 15/713,576, filed on Sep. 22, 2017, now Pat. No. 10,322,727.

(60) Provisional application No. 62/447,713, filed on Jan. 18, 2017.

(51) Int. Cl.
*B60W 40/09* (2012.01)
*B60W 50/14* (2020.01)
*B60W 40/08* (2012.01)
*B60R 1/12* (2006.01)
*G06K 9/00* (2006.01)

(52) U.S. Cl.
CPC ............ *B60W 40/09* (2013.01); *B60W 50/14* (2013.01); *G06K 9/00845* (2013.01); *B60R 2001/1253* (2013.01); *B60W 2040/0872* (2013.01); *B60W 2050/146* (2013.01); *B60W 2540/22* (2013.01)

(58) Field of Classification Search
CPC .............................. B60W 40/09; B60W 50/14
See application file for complete search history.

(56) References Cited

U.S. PATENT DOCUMENTS

| | | | |
|---|---|---|---|
| 5,850,193 A * | 12/1998 | Shimoura | G01C 21/26 340/995.1 |
| 8,954,340 B2 | 2/2015 | Sanchez et al. | |
| 9,135,803 B1 * | 9/2015 | Fields | B60K 28/066 |
| 9,646,428 B1 * | 5/2017 | Konrardy | G07C 5/008 |
| 9,734,685 B2 * | 8/2017 | Fields | G08B 21/02 |
| 9,767,516 B1 * | 9/2017 | Konrardy | B60W 40/09 |
| 9,908,530 B1 * | 3/2018 | Fields | B60K 28/066 |

(Continued)

*Primary Examiner* — Santiago Garcia
(74) *Attorney, Agent, or Firm* — Marshall, Gerstein & Borun LLP

(57) ABSTRACT

Systems and methods for analyzing sensor data to determine an inferred emotional state of a vehicle operator and generate a recommendation based on the inferred emotional state are disclosed. According to embodiments, an electronic device may analyze image data depicting a vehicle operator to identify a behavior. The electronic device may also compare vehicle dynamics data to baseline vehicle dynamics data to determine if the vehicle dynamics data differs from the baseline vehicle dynamics data by a threshold amount. Based on the identified behavior and the vehicle dynamics data, the electronic device may determine an inferred emotional state of the vehicle operator. The electronic device may generate a recommendation for the vehicle operator based on the inferred emotional state.

20 Claims, 6 Drawing Sheets

(56) References Cited

U.S. PATENT DOCUMENTS

| | | | |
|---|---|---|---|
| 10,394,236 B2 * | 8/2019 | Wiklinska | G06K 9/00832 |
| 2006/0011399 A1 * | 1/2006 | Brockway | A61B 5/18 180/272 |
| 2009/0040054 A1 * | 2/2009 | Wang | B60W 30/095 340/576 |
| 2013/0009761 A1 * | 1/2013 | Horseman | A61B 5/6893 340/425.5 |
| 2014/0171752 A1 * | 6/2014 | Park | A61B 5/165 600/301 |
| 2014/0218187 A1 * | 8/2014 | Chun | G08B 21/06 340/439 |
| 2014/0309862 A1 * | 10/2014 | Ricci | G01C 21/26 701/36 |
| 2015/0254955 A1 * | 9/2015 | Fields | G08B 21/02 705/4 |
| 2016/0123743 A1 * | 5/2016 | Sisbot | G01C 21/3461 701/538 |
| 2016/0185356 A1 * | 6/2016 | Di Censo | B62D 1/046 701/36 |
| 2016/0196105 A1 * | 7/2016 | Vartakavi | G06F 3/165 700/94 |
| 2016/0236690 A1 * | 8/2016 | Juneja | G06F 3/16 |
| 2017/0011640 A1 * | 1/2017 | Rebolledo-Mendez | G09B 5/00 |
| 2017/0176198 A1 * | 6/2017 | Tatourian | G08G 1/205 |
| 2018/0031405 A1 * | 2/2018 | Berentsen | B60K 35/00 |
| 2018/0118218 A1 * | 5/2018 | Miloser | B60W 50/14 |
| 2018/0174457 A1 * | 6/2018 | Taylor | G06K 9/00302 |

\* cited by examiner

TECHNOLOGY FOR ASSESSING EMOTIONAL STATE OF VEHICLE OPERATOR

CROSS-REFERENCE TO RELATED APPLICATIONS

This application is a continuation of U.S. patent application Ser. No. 15/713,576, which is entitled "TECHNOLOGY FOR ASSESSING EMOTIONAL STATE OF VEHICLE OPERATOR," which was filed Sep. 22, 2017, and which claims the benefit of provisional U.S. Patent Application No. 62/447,713, which is entitled "TECHNOLOGY FOR ASSESSING EMOTIONAL STATE OF VEHICLE OPERATOR," and which was filed on Jan. 18, 2017. The disclosure of both of the aforementioned applications is hereby expressly incorporated by reference herein in its entirety.

TECHNICAL FIELD

The present disclosure is directed to technology for assessing an emotional state of a vehicle operator. More particularly, the present disclosure is directed to systems and methods for analyzing sensor data to determine an inferred emotional state of a vehicle operator and generating a recommendation for the vehicle operator based on the inferred emotional state.

BACKGROUND

Individuals have been operating vehicles as a means of transportation for decades. In particular, individuals may sometimes operate vehicles when they are in an emotional state which may impair operation or when they may otherwise modify their driving, such as if the individuals are upset or frustrated. This generally unsafe vehicle operation may lead to accidents, injuries, or other negative effects.

Recently, vehicles have been equipped with certain computing components and devices. As vehicles incorporate more sensors, devices, and communication capabilities, it is increasingly easier to collect and analyze image sensor data and vehicle dynamics data for various purposes. However, there are no existing solutions to effectively and efficiently leverage certain types of sensor data to identify emotional states of vehicle operators and reduce risks accordingly. Accordingly, there is an opportunity for technology to facilitate functionalities for this purpose.

SUMMARY

A computer-implemented method in an electronic device for assessing an emotional state of a vehicle operator is provided. The method comprises: dynamically analyzing, by a processor, image data captured by one or more image sensors located within the vehicle, the image data depicting the operator of the vehicle, to identify a current behavior of the operator; comparing, by the processor, vehicle dynamics data associated with operation of the vehicle to baseline vehicle dynamics data to determine that the vehicle dynamics data differs from the baseline vehicle dynamics data; and in response to the comparing, determining, based on both the vehicle dynamics data and the identified current behavior of the operator, an inferred current emotional state of the operator.

In another embodiment, an electronic device configured to assess an emotional state of an operator of a vehicle is provided. The electronic device may include a transceiver configured to communicate data via at least one network connection, a memory configured to store non-transitory computer executable instructions and a set of baseline image data, and a processor configured to interface with the transceiver and memory, and to execute the non-transitory computer executable instructions. The computer executable instructions may cause the processor to access image data depicting the operator of the vehicle, analyze the image data to: dynamically analyze image data captured by one or more image sensors located within the vehicle, the image data depicting the operator of the vehicle, to identify a current behavior of the operator; compare vehicle dynamics data associated with operation of the vehicle to baseline vehicle dynamics data to determine that the vehicle dynamics data differs from the baseline vehicle dynamics data; and, in response to the comparing, determine, based on both the vehicle dynamics data and the identified current behavior of the operator, an inferred current emotional state of the operator.

In still another embodiment, a tangible, non-transitory computer-readable medium storing executable instructions for assessing an emotional state of an operator of a vehicle is provided. The instructions, when executed by at least one processor of a computing device, cause the computing device to: dynamically analyze image data captured by one or more image sensors located within the vehicle, the image data depicting the operator of the vehicle, to identify a current behavior of the operator; compare vehicle dynamics data associated with operation of the vehicle to baseline vehicle dynamics data to determine that the vehicle dynamics data differs from the baseline vehicle dynamics data; and, in response to the comparing, determine, based on both the vehicle dynamics data and the identified current behavior of the operator, an inferred current emotional state of the operator.

DETAILED DESCRIPTION

Figure 1A:
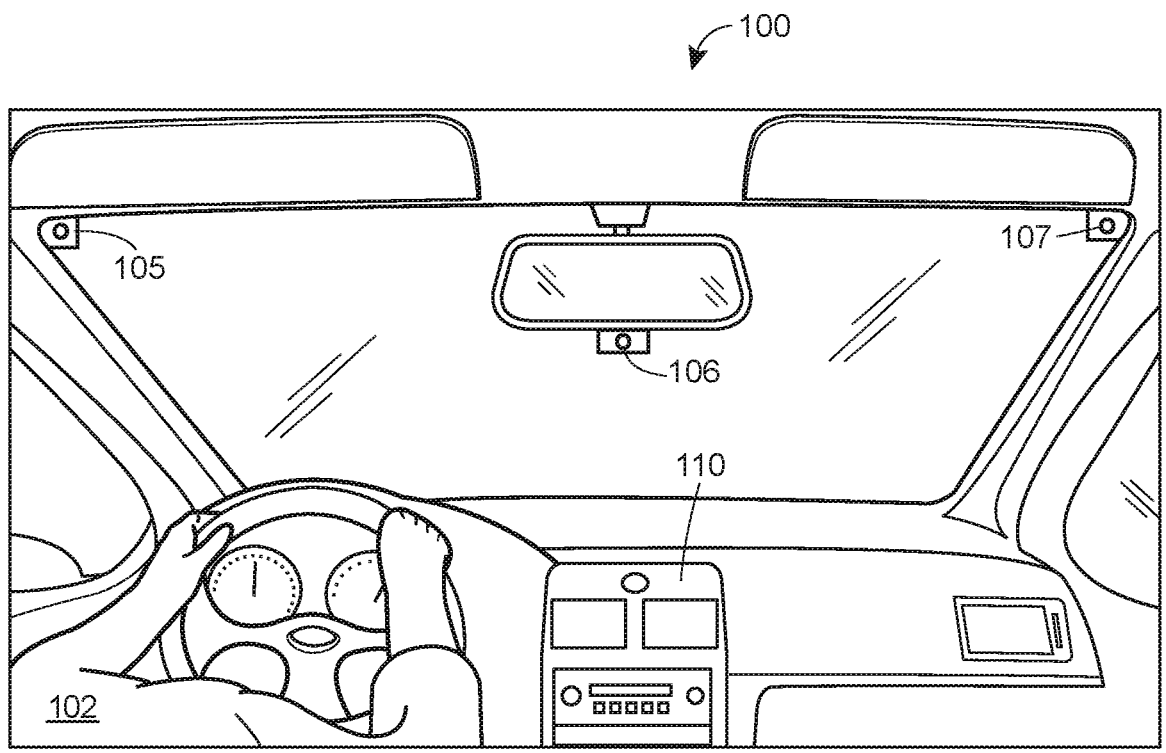
FIGS. 1A and 1B depict example environments within a vehicle including various components configured to facilitate various functionalities, in accordance with some embodiments.

The present embodiments may relate to, inter alia, dynamically assessing the emotional state of a vehicle operator. According to certain aspects, systems and methods may access image data that depicts a vehicle operator, and may analyze the image data to identify the vehicle operator as well as an operator behavior, such as a facial expression made by the vehicle operator or a movement made by the vehicle operator. The systems and methods may also access vehicle dynamics data and compare it to baseline vehicle dynamics data. Based on the operator behavior and/or a difference between the vehicle dynamics data and baseline vehicle dynamics data, the systems and methods may determine an inferred emotional state of the vehicle operator. Based on the inferred emotional state of the vehicle operator, the systems and methods may determine whether a vehicle operator is in an appropriate emotional state for operating a vehicle and/or may generate a recommendation to the vehicle operator based on the identified inferred emotional state, where the recommendation may aim to mitigate any risks that may be posed by the inferred emotional state.

The systems and methods therefore offer numerous benefits. In particular, the systems and methods effectively and efficiently determine an emotional state of a vehicle operator and provide recommendations to the vehicle operator accordingly. These recommendations can help a vehicle operator to exercise caution or otherwise drive more safely. Thus, safety may be increased and occurrences of accidents and collisions may be reduced. It should be appreciated that other benefits are envisioned.

The systems and methods discussed herein address a challenge that is particular to vehicle operation. In particular, the challenge relates to reducing vehicular risks, especially instances in which vehicle operators may have an increased state of agitation. An angry, frustrated, or upset vehicle operator, for instance, may not drive as safely as one in a "normal" emotional state. Using conventional methods, a vehicle operator would have to self-regulate their behavior, often without realizing that he/she is in an increased state of agitation or that it may impact driving safety. The systems and methods offer improved capabilities to solve these problems by dynamically accessing and analyzing image data and/or vehicle dynamics data to determine an inferred emotional state of a vehicle operator, and generate and communicate recommendations to the vehicle operator based on the inferred emotional state. Accordingly, vehicle operators may be reminded to exercise caution or otherwise drive more safely when in an emotionally charged state. Further, because the systems and methods employ the collection, analysis, and transmission of data associated with vehicles, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data to determine vehicle operator behaviors, collect or accumulate vehicle dynamics data, determine vehicle operator emotional states, and generate and display recommendations, among other functionalities.

According to implementations, the systems and methods may support a dynamic, real-time or near-real-time analysis of any captured, received, and/or detected data. In particular, the electronic device may receive or capture image and vehicle dynamics data in real-time or near real-time, and may automatically and dynamically analyze the captured data. The electronic device may also automatically and dynamically generate and communicate relevant notifications in real-time or near-real-time. In this regard, any individual who receives a notification is afforded the benefit of accurate and relevant data.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various vehicle dynamics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include at least one of: a location module (e.g., a global positioning system (GPS) chip), image sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors.

Figure 1B:
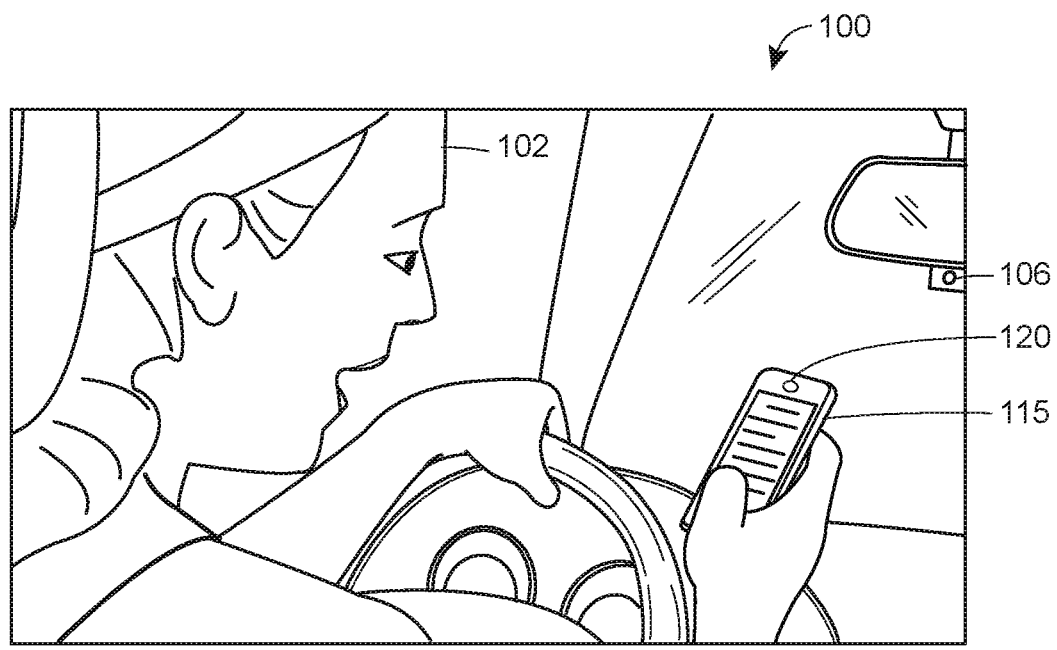

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. Additionally or alternatively, the electronic devices 110, 115 may analyze the image data to detect any movements made by the individual 102 that may be depicted in the image data, as well as determine or ascertain a state of the individual 102. Further, the electronic devices 110, 115 may further interface with the various sensors or other components to assess real-time environmental parameters associated with operation of the vehicle 100 (e.g., speed, location, route information, current time, current date).

Figure 1C:
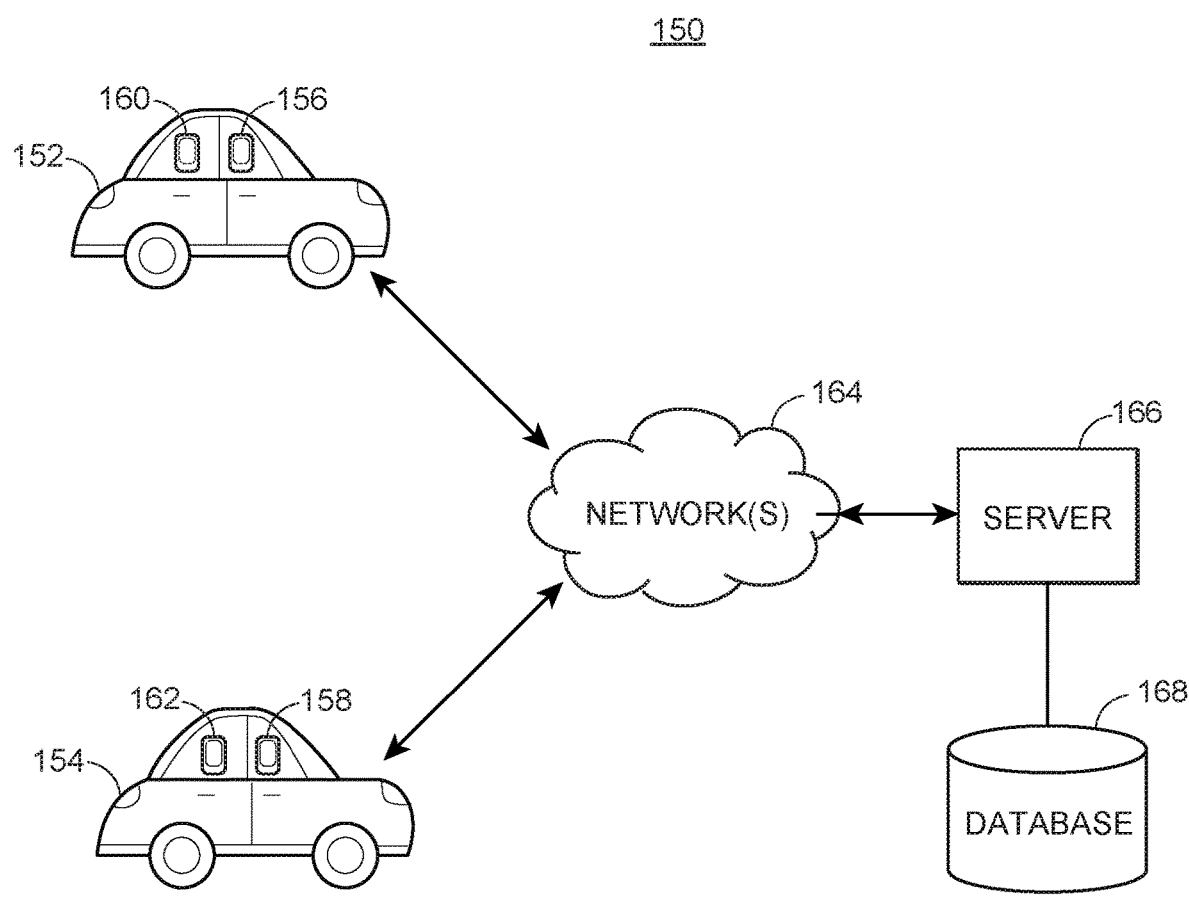
FIG. 1C depicts an example environment including vehicles and various components configured to facilitate various functionalities, in accordance with embodiments.

FIG. 1C illustrates a system 150 that includes a set of vehicles 152, 154. Although FIG. 1C depicts two (2) vehicles 152 and 154, it should be appreciated that fewer or additional vehicles are envisioned. The vehicle 152 may be configured or equipped with a set of electronic devices 156, 160, and the vehicle 154 may be configured or equipped with a set of electronic devices 158, 162. The electronic devices 156, 158, 160, 162 may be integrated within the respective vehicles 152 and 154 or may be separate from (but located within or in proximity to) the respective vehicles 152 and 154.

In some implementations, the electronic devices 160 and 162 may be included as part of an on-board diagnostic (OBD) system or any other type of system configured to be installed in the respective vehicle 152 and 154, such as an original equipment manufacturer (OEM) system. The electronic devices 160 and 162 may include a set of vehicle dynamics sensors configured to detect and record various vehicle dynamics data associated with operation of the respective vehicles 152 and 154. The vehicle dynamics sensors may include, but are not limited to, any of the following: clock, accelerometer, location module (e.g., GPS chip), thermometer, seat heater sensor, gyroscope, compass, biometric, ignition sensor, speedometer, torque sensor, throttle position sensor, and/or other sensors. In some embodiments, the vehicle dynamics sensors may be or may include vehicle telematics sensors. Generally, some of the set of vehicle dynamics sensors may be configured to generate vehicle dynamics data (sometimes referred to as telematics data) associated with operation of the vehicle, where the set of vehicle dynamics data may indicate, e.g., speed, heading, acceleration data, braking data, turning data, and/or other relevant vehicle dynamics or telematics parameters associated with operation of the vehicle. In some implementations, the electronic devices 160 and 162 may be configured to communicate with (i.e., request, retrieve, and/or receive data from) a set of sensors disposed in other locations of the respective vehicles 152 and 154.

Further, in some implementations, the electronic devices 156 and 158 may be any type of electronic device such as a mobile device. For example, the electronic devices 156 and 158 may be smartphones associated with respective operators of the respective vehicles 152 and 154. It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic devices 156 and 158 may be configured to communicate and interface with the respective electronic devices 160 and 162. Further, although not depicted in FIG. 1C, the vehicles 152 and 154 and/or each of the electronic devices 156, 158, 160, 162 may be equipped with storage or memory capable of storing various data.

According to embodiments, the set of sensors included in any or all of the electronic devices 156, 158, 160, 162 or otherwise configured to communicate with any or all of the electronic devices 156, 158, 160, 162 may be of various types. For example, the set of sensors may include at least one of: a location module (e.g., a global positioning system (GPS) chip), image sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors. The set of sensors may also be configured to detect various conditions of the vehicle operators, including various biometric information, movements, and/or the like.

Each of the electronic devices 156, 158, 160, 162 may be configured to communicate with at least one remote server 166 via one or more networks 164. It should be appreciated that various amounts of the remote server(s) 166 are envisioned. According to embodiments, the remote server(s) 166 may store data (i.e., may serve as a central repository) and/or exchange data with the electronic devices 156, 158, 160, 162. For example, the remote server 166 may store data or information associated with a set of locations, and may provide the data or information to the electronic devices 156, 158, 160, 162. The remote server 166 may also include logic or processing capabilities that may instruct the electronic devices 156, 158, 160, 162 to perform certain actions. The network(s) 164 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 164 may also be one or more private or local networks or dedicated frequency bands. The network(s) 164 may enable the electronic devices 156, 158, 160, 162 and the remote server(s) 166 to communicate among each other in real-time or near-real time.

The remote server 166 may interface with a database 168 or other memory, which may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. According to embodiments, the database 168 may store various types of data received from the electronic devices 156, 158, 160, 162 via the network(s) 164. Further, in embodiments, the database 168 may store additional information received from the server 166 or from one or more additional servers (not shown in FIG. 1C).

In a particular implementation, one or more of the electronic devices 156, 158, 160, 162 associated with the vehicles 152 and 154 may accumulate or record vehicle dynamics data during operation of the vehicles 152 and 154, and transmit the vehicle dynamics data, via the network(s) 164, to the server(s) 166 for storage on the database 168. The vehicle dynamics data may indicate, among other data, respective locations of the vehicles 152 and 154 (i.e., the locations of the vehicles 152 and 154 when the vehicle dynamics data was accumulated or recorded).

Figure 2:
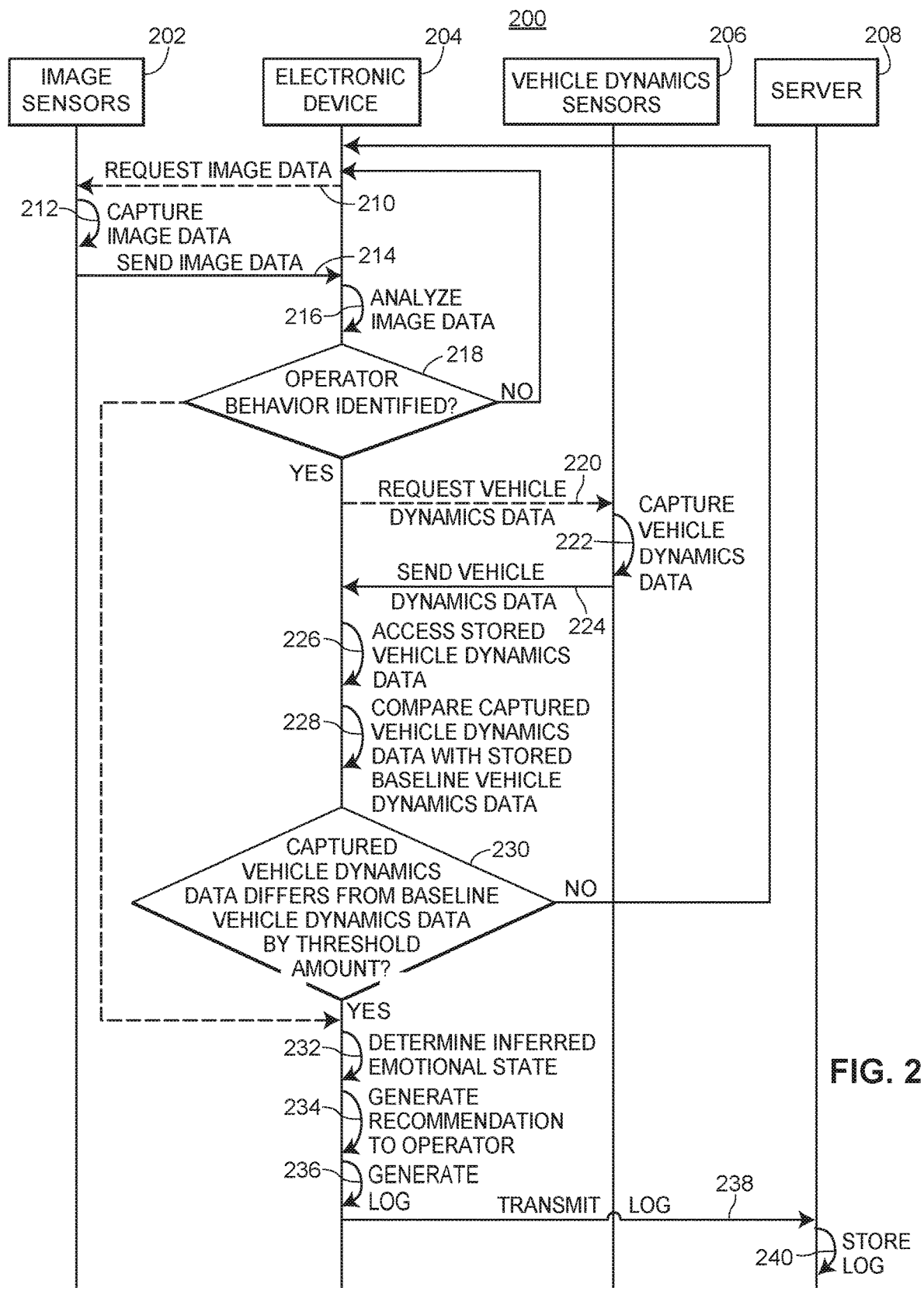
FIG. 2 depicts an exemplary signal diagram associated with assessing the emotional state of an operator of a vehicle, in accordance with some embodiments.

FIG. 2 depicts a signal diagram 200 associated with facilitating certain functionalities of the systems and methods. The signal diagram 200 includes image sensors 202, an electronic device 204, vehicle dynamics sensors 206, and at least one server 208. According to embodiments, the electronic device 204 may be located within a vehicle. Further, the electronic device 204 may be equipped with or configured to communicate with the image sensors 202 and the vehicle dynamics sensors 206. Additionally, the electronic device 204 may be configured to communicate with the at least one server 208. It should be appreciated that additional or alternative components and devices are envisioned.

The signal diagram 200 may begin when the electronic device 204 optionally requests (210) image data from the image sensors 202. According to embodiments, the electronic device 204 may automatically request the image data periodically (e.g., once every ten seconds, once every minute, once every hour), or a user of the electronic device 204 may cause the electronic device 204 to request the image data. Further, the request may include a specified amount of image data and/or a specific time component (e.g., real-time image(s), real-time video, image(s) and/or video recorded five minutes ago). It should be appreciated that the image sensors 202 may be internal to or external from the electronic device 204.

The image sensors 202 may capture (212) image data and send (214) the image data to the electronic device 204. In one implementation, the image sensors 202 may automatically send the image data to the electronic device 204 in real-time or near real-time as the image sensors 202 capture the image data, and/or in response to a request from the electronic device 204. In another implementation, the image sensors 202 may send previously-captured image data to the electronic device 204, such as if the image sensors 202 interface with some type of memory or storage. It should be appreciated that the image data may depict a vehicle operator.

The electronic device 204 may analyze (216) the image data. It should be appreciated that in analyzing the image data, the electronic device 204 may use or employ any type of image analysis technique. For example, the electronic device 204 may access, from local memory or from an external source (e.g., a remote server), a set of baseline image data that may depict general movements, gestures, vehicle operators, and the like. The electronic device 204 may analyze the captured image data in combination with the set of baseline image data to identify the operator depicted in the image data as well as a set of movements, positions, or changes carried out, undertaken, or performed by the operator (generally, an operator behavior. For example, the electronic device 204 may determine, by analyzing the image data, movements, positions, or changes in the operator's face, head, hands or any other part of the operator. The identification of an operator behavior may be based on the movements, positions, or changes determined by the electronic device 204. Certain movements, positions, or changes, or combinations of movements, positions, or changes, may indicate certain operator behaviors. For example, the turning upwards of the corners of an operator's mouth may indicate the operator behavior of smiling, and the movement of an operator's head from side to side may indicate the operator behavior of shaking the head. As another example, an opening of the operator's mouth, combined with the movement of the operator's hands, may indicate the operator behavior of yelling. Based on the analysis of (216), the electronic device 204 may determine (218) if an operator behavior is identified. If no operator behavior is identified ("NO"), processing may repeat, end, or proceed to another functionality. If an operator behavior is identified ("YES"), processing may proceed to the following steps.

The electronic device 204 may optionally request (220) vehicle dynamics data from the vehicle dynamics sensors 206. According to embodiments, the electronic device 204 may automatically request the vehicle dynamics data periodically (e.g., once every ten seconds, once every minute, once every hour), or a user of the electronic device 204 may cause the electronic device 204 to request the vehicle dynamics data. Additionally, the electronic device 204 may request the vehicle dynamics data in response to identifying an operator behavior in (218). Further, the request may include a specified amount of vehicle dynamics data, specific types of vehicle dynamics data, and/or a specific time component (e.g., real-time vehicle dynamics data, and/or vehicle dynamics data recorded five minutes ago). Moreover, the electronic device 204 may request the vehicle dynamics data before or concurrent with requesting the image data and/or analyzing the image data. It should be appreciated that the vehicle dynamics sensors 206 may be internal to or external from the electronic device 204. In a particular implementation, the vehicle dynamics sensors 206 may be incorporated within the vehicle.

The vehicle dynamics sensors 206 may capture (222) vehicle dynamics data and send (224) the vehicle dynamics data to the electronic device 204 in real-time or near real-time as the vehicle dynamics sensors 206 capture the vehicle dynamics data, and/or in response to a request from the electronic device 204. In another implementation, the vehicle dynamics sensors 206 may send previously-captured vehicle dynamics data to the electronic device 204, such as if the vehicle dynamics sensors 206 interface with some type of memory or storage. The vehicle dynamics sensors 206 may include, but are not limited to, any of the following: clock, accelerometer, location module (e.g., GPS chip), thermometer, seat heater sensor, gyroscope, compass, biometric, ignition sensor, speedometer, torque sensor, throttle position sensor, and/or other sensors, including, e.g., any types of vehicle telematics data sensors. Generally, some of the set of vehicle dynamics sensors 206 may be configured to generate vehicle dynamics data associated with operation of the vehicle, where the set of vehicle dynamics data may indicate, e.g., speed, heading, acceleration data, braking data, turning data, and/or other relevant parameters associated with operation of the vehicle.

The electronic device 204 may access (226) stored baseline vehicle dynamics data and compare (228) the captured vehicle dynamics data to the stored baseline vehicle dynamics data. The captured vehicle dynamics data may be compared to the stored baseline vehicle dynamics data over a set time interval, such as every minute, every fifteen minutes, or any other time interval. The stored baseline vehicle dynamics data may be associated with an operator of the vehicle, and may include various metrics such as average driving speed, average acceleration to reach driving speed, average deceleration to stop, average time spent driving a particular route, average braking force when stopping the vehicle, average turn radius, average number of honks in a given period of time, or any other vehicle dynamics data and/or vehicle telematics data associated with the operator. The stored baseline vehicle dynamics data may be vehicle dynamics data that has previously been captured by the vehicle dynamics sensors 206, by additional vehicle dynamics sensors collected by additional vehicles operated by the vehicle operator, and/or a combination thereof. In other embodiments, the stored baseline vehicle dynamics data may have originated from a separate database, or may be a combination of vehicle dynamics data previously captured by the vehicle dynamics sensors 206 (or other vehicle dynamics sensors associated with additional vehicles) and originating from a separate database, and/or may be general baseline data that is not associated with the operator of the vehicle.

Based on the comparing of (228), the electronic device 204 may determine (230) whether the captured vehicle dynamics data differs from the baseline vehicle dynamics data by at least a threshold amount. The threshold amount may be set by the user, or may be default or preset. The threshold amount may be a percentage of the value of the captured vehicle dynamics data parameter, or it might be an absolute value. For instance, the threshold amount could be exceeded when a vehicle operator drives 10% faster than the stored baseline average driving speed, or it may be exceeded when a vehicle operator drives 10 miles per hour faster than the stored baseline average driving speed. The threshold amount may be different for different data parameters. For example, for driving speed the threshold amount may be a 10% difference between captured driving speed and stored baseline average driving speed, while for driving acceleration, the threshold amount may be a 5% difference from captured acceleration and stored baseline average acceleration. In various embodiments, the threshold may be exceeded only if the difference is an increase, or it may be exceeded for an increase or a decrease by a threshold amount.

If the electronic device 204 determines that the captured vehicle dynamics data does not differ from the baseline stored vehicle dynamics data by at least the threshold amount ("NO"), processing may repeat, end, or proceed to other functionality (e.g., to (222)).

If the electronic device 204 determines that the captured vehicle dynamics data differs from the baseline stored vehicle dynamics data by at least the threshold amount ("YES"), the electronic device 204 may further determine (232) an inferred emotional state of the vehicle operator. In particular, the electronic device 204 may determine the inferred emotional state based on the extent to which the captured vehicle dynamics data differs from the baseline vehicle dynamics data and/or based on which particular vehicle dynamics data points differ from their stored baseline values. For example, the electronic device 204 may determine that an increase in honking, as compared with stored baseline vehicle dynamics data, indicates an inferred frustrated emotional state. The inferred emotional state may additionally or alternatively be based on the operator behavior identified (218) by the electronic device 204. For example, the electronic device 204 may determine that an operator behavior of frowning indicates an inferred emotional state of sad, while an operator behavior of yelling indicates an inferred emotional state of angry or frustrated.

The electronic device 204 may further determine an inferred emotional state based on a combination of the operator behavior and the differences between stored baseline vehicle dynamics data and captured vehicle dynamics data. For example, the electronic device 204 may determine that an operator behavior of smiling combined with an increased average speed indicates an inferred emotional state of excited, while an operator behavior of frowning combined with an increased average speed indicates an inferred emotional state of angry or frustrated.

The electronic device 204 may determine, based on the inferred emotional state, that the operator may not be in an appropriate emotional state for driving a vehicle. The extent or duration of the operator behavior, and/or the extent or duration that the vehicle dynamics data differ from the baseline vehicle dynamics data, or a combination of the two may indicate that the operator may not be in an appropriate emotional state for driving a vehicle. For example, extremely erratic operator behavior may indicate that the operator may not be in an appropriate emotional state. An operator behavior with a long duration, such as crying for a long time, for example, may also indicate that the operator may not be in an appropriate emotional state. Greatly increased average speed, such as a 50% increase in average speed over baseline, for instance, may also indicate that the operator may not be in an appropriate emotional state. Increased average speed for a long period of time, for example, may also indicate that the operator may not be in an appropriate emotional state. A combination of an operator behavior of frowning for a long time and a greatly increased average number of honks, for instance, may also indicate that an operator may not be in an appropriate emotional state.

The electronic device 204 may generate (234) a recommendation to the operator, and may communicate the recommendation to the operator, where the recommendation may be reflective of the inferred emotional state and/or may indicate a suggested action to perform or undertake. For example, in response to an operator's inferred emotional state of anger or frustration, the recommendation may be that the operator pull over and do a relaxation exercise, while in response to an emotional state of sadness, the recommendation may be that the operator listen to upbeat music using the vehicle's audio system. The electronic device 204 may also take other action(s) based on the inferred emotional state.

The electronic device 204 may further generate (236) a log of the inferred emotional state and/or other information associated with the analyses discussed herein. The log may include a timestamp corresponding to the time when the captured vehicle dynamics and/or image data indicating an inferred emotional state was recorded. The log may include information including the extent to which the vehicle dynamics data differs from the stored baseline vehicle dynamics data, and/or including which particular vehicle dynamics data parameters differ from their corresponding baseline values. The log may also include information including any identification of operator behavior, including the movements or changes associated with the operator upon which the identification was based, and/or information associated with the generated recommendations.

The electronic device 204 may further transmit (238) the log to the server 208. The log may be transmitted via a network connection. In some embodiments, the log may be transmitted via a wired connection. The server 208 may store (240) the log for later access or review by users, administrators, and/or electronic devices.

Figures 3A, 3B:
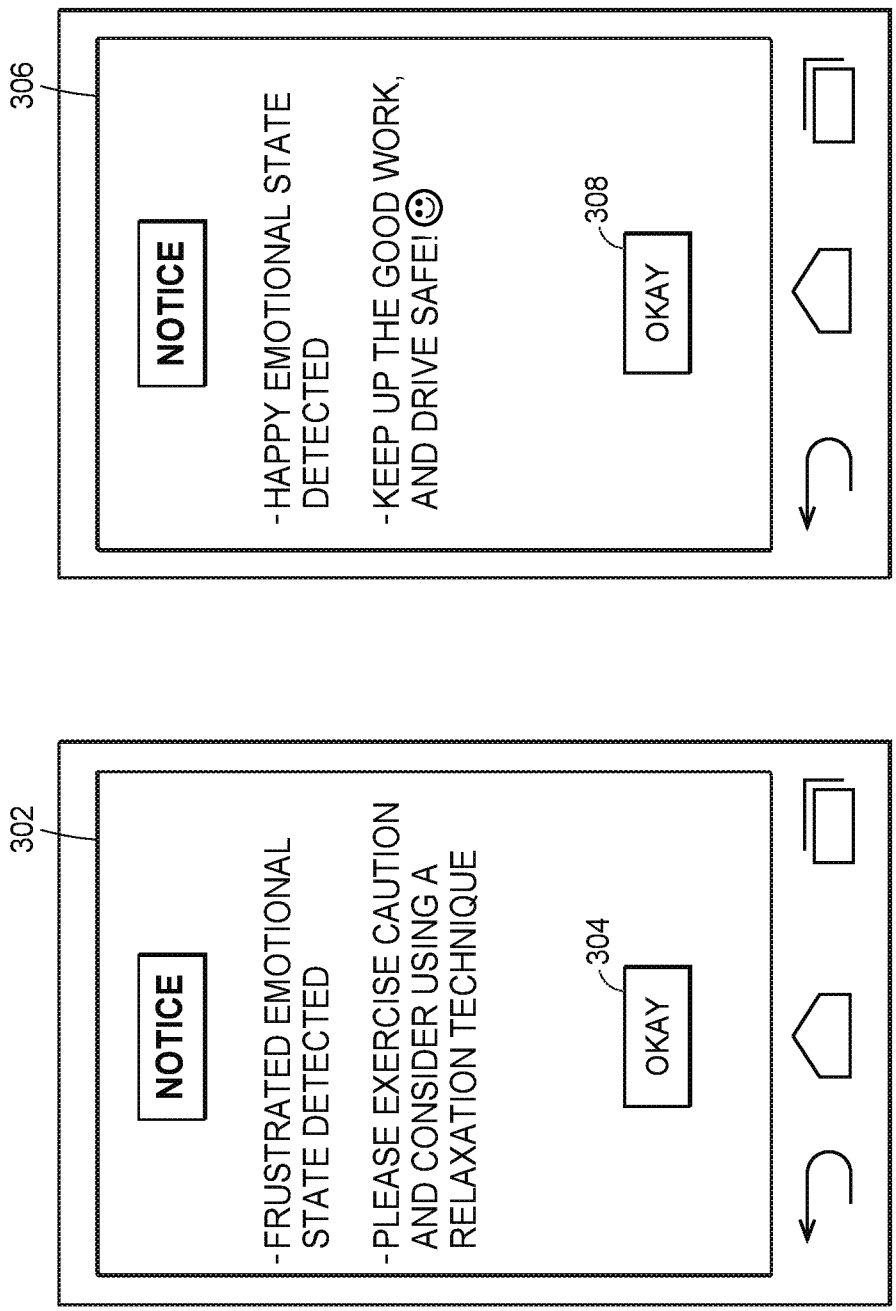
FIGS. 3A and 3B depict user interfaces associated with example notifications and visualizations, in accordance with some embodiments.

FIGS. 3A and 3B illustrate interfaces including example notifications. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely examples and that alternative or additional content is envisioned.

FIG. 3A illustrates an interface 302 that includes a notice indicating that an inferred emotional state of frustrated has been detected. The interface 302 further indicates a generated recommendation for the operator, namely to exercise caution and consider using a relaxation technique. The interface 302 includes an "OK" selection 304 that enables the vehicle operator to dismiss the interface 302.

FIG. 3B illustrates an interface 306 that includes a notice indicating that an inferred emotional state of happy has been detected. The interface 306 further indicates a generated recommendation for the associated vehicle operator, namely to keep up the good work and continue to drive safely. The interface 306 includes an "OK" selection 308 that enables the vehicle operator to dismiss the interface 306.

Figure 4:
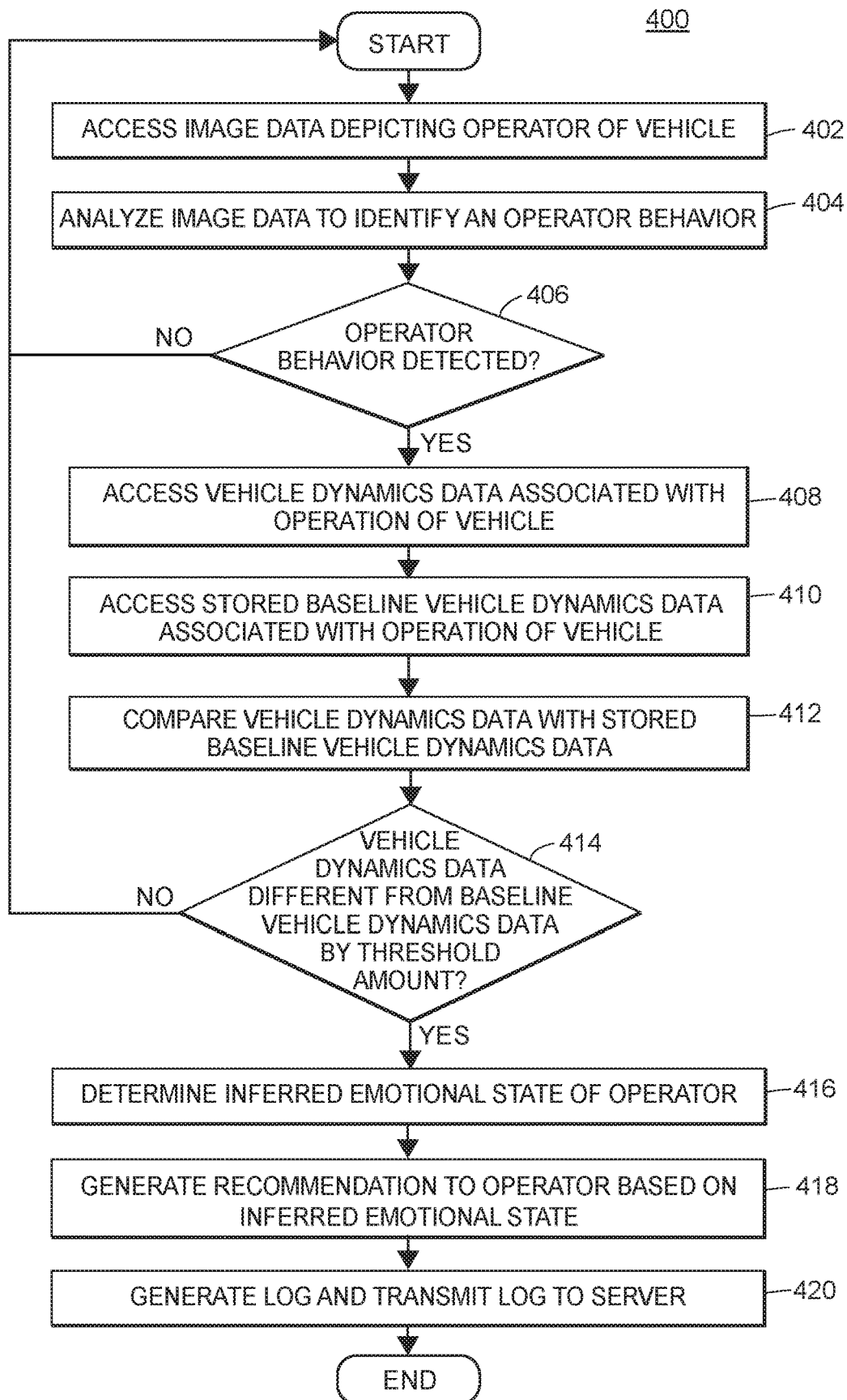
FIG. 4 depicts an exemplary flow diagram associated with assessing the emotional state of an operator of a vehicle, in accordance with some embodiments.

FIG. 4 depicts a block diagram of an exemplary method 400 of assessing an emotional state of an operator of a vehicle. The method 400 may be facilitated by an electronic device such as electronic devices 110, 115, 156, 156, 160, 162, as discussed with respect to FIG. 1A-1C, or the electronic device 204 as discussed with respect to FIG. 2. The electronic device may support execution of a dedicated application that may facilitate the functionalities of the method 400. Further, the electronic device may enable the user to make various selections and facilitate various functionalities.

The method may begin when the electronic device accesses (block 402) image data depicting the operator of the vehicle. In embodiments, the electronic device may access the image data from a set of image sensors during operation of the vehicle by the operator. The electronic device may analyze (block 404) the image data to identify an operator behavior that may be depicted in the image data. According to embodiments, the electronic device may analyze the image data to identify the operator depicted in the image data as well as a set of movements, positions, or changes carried out, undertaken, or performed by the operator. For example, the electronic device may determine, by analyzing the images, movements, positions, or changes in the operator's face, head, hands or any other part of the operator. The identification of an operator behavior may be based on the movements, positions, or changes determined by the electronic device. Certain movements, positions, or changes, or combinations of sets of movements, positions, or changes, may indicate certain operator behaviors. If no operator behavior is identified (block 406, "NO"), processing may repeat, end, or proceed to another functionality. If an operator behavior is identified (block 406, "YES"), processing may proceed to block 408.

At block 408, the electronic device may access (block 408) vehicle dynamics data associated with the operation of the vehicle. The vehicle dynamics data may originate from vehicle dynamics sensors. The electronic device may access (block 410) stored baseline vehicle dynamics data associated with the operation of the vehicle, and in particular with operation of the vehicle by the vehicle operator. In embodiments, the electronic device may locally access the stored baseline vehicle dynamics data or may access the stored baseline vehicle dynamics data from a remote server via a network connection.

The electronic device may compare (block 412) the vehicle dynamics data with the stored baseline vehicle dynamics data. The captured vehicle dynamics data may be compared with the stored baseline vehicle dynamics data over a set time interval, such as every minute, every fifteen minutes, or any other time interval. If the electronic device determines that the captured vehicle dynamics data does not differ from the baseline stored vehicle dynamics data by at least a threshold amount (block 414, "NO"), processing may repeat, end, or proceed to other functionality. The threshold amount may be set by the user, or may be default or preset. The threshold amount may be a percentage of the value of the captured vehicle dynamics data parameter, or it might be an absolute value.

If the vehicle dynamics data is different from the stored baseline vehicle dynamics data by at least the threshold amount (block 414, YES), the electronic device may determine (block 416) an inferred emotional state of the operator. According to embodiments, the electronic device may determine an inferred emotional state based on the extent to which the captured vehicle dynamics data differs from the baseline vehicle dynamics data and/or based on which particular vehicle dynamics data points differ from their stored baseline values. Additionally or alternatively, the electronic device may determine the inferred emotional state based on the identified operator behavior.

Additionally or alternatively, the electronic device may determine the inferred emotional state based on a combination of the operator behavior and the differences between the stored baseline vehicle dynamics data and the captured vehicle dynamics data. The electronic device may determine, based on the inferred emotional state, that the operator may not be in an appropriate emotional state for driving a vehicle.

The electronic device may generate (block 418) a recommendation for the operator based on the determined inferred emotional state. If the electronic device has determined that the operator may not be in an appropriate emotional state for driving a vehicle, the generated recommendation may be cautionary. If the electronic device has determined that the operator is in an appropriate emotional state for driving a vehicle, the generated recommendation may be encouraging. The recommendation may be displayed to the operator on a user interface, as shown in and as described with respect to FIG. 3.

The electronic device may generate and transmit (block 420) a log to a server. According to embodiments, the log may include a set of information associated with any of the analyses and determinations as described herein, and may be transmitted via a wired or wireless network connection.

Figure 5:
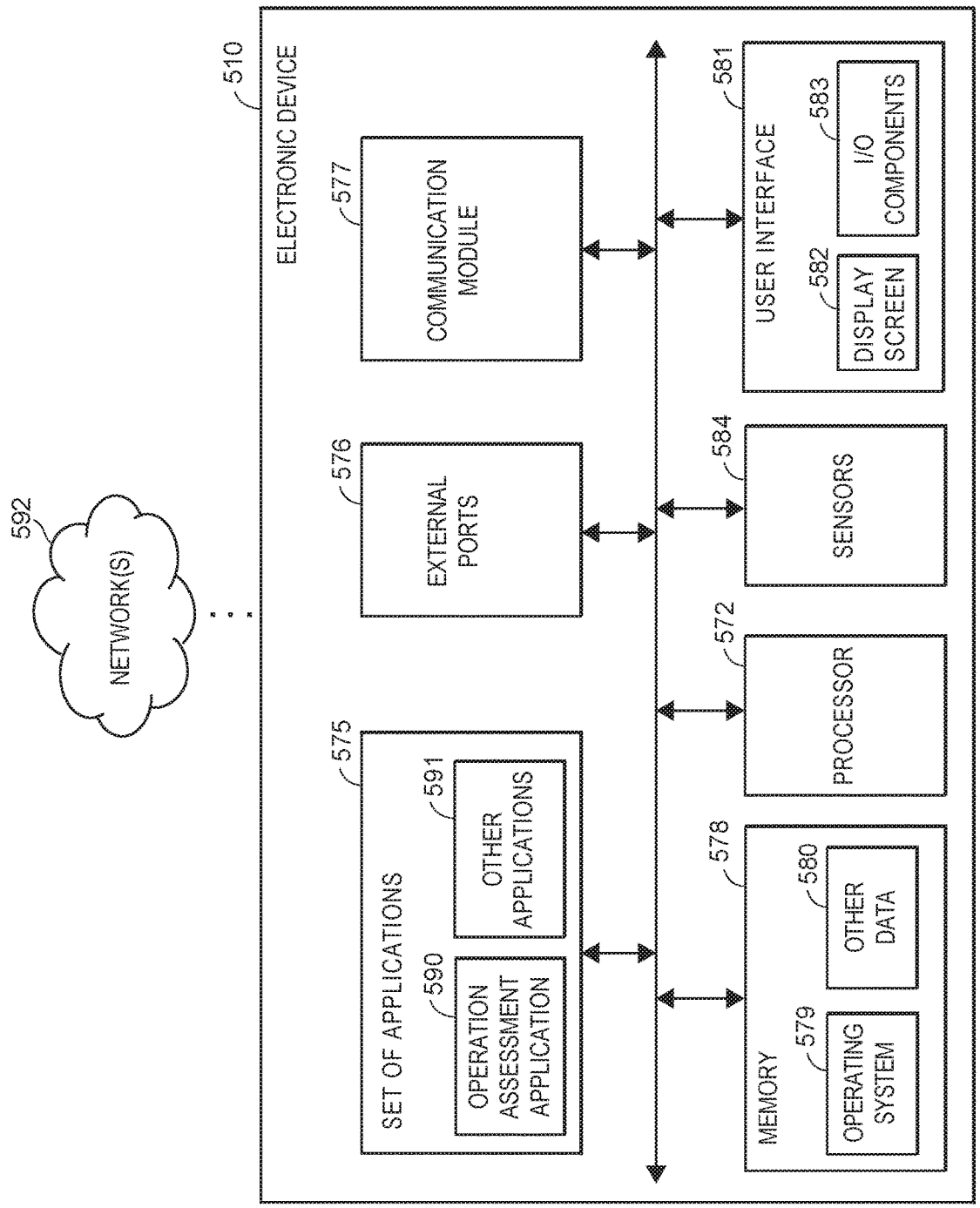
FIG. 5 depicts a block diagram of an exemplary electronic device, in accordance with some embodiments.

FIG. 5 illustrates a diagram of an exemplary mobile or other electronic device 510 (such as one of the electronic devices 110, 115, 156, 156, 160, 162, as discussed with respect to FIG. 1A-1C, or the electronic device 204 as discussed with respect to FIG. 2) in which the functionalities as discussed herein may be implemented. It should be appreciated that the electronic device 510 may be configured to be transported in a vehicle and/or connect to an on-board vehicle dynamics platform of the vehicle, as discussed herein. Further, it should be appreciated that the electronic device 510 may be integrated into an on-board system of the vehicle. In an embodiment, the electronic device 510 may also be incorporated in a server, such as the remote server 166 as discussed with respect to FIG. 1C.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an operation assessment application 590 configured to analyze image and vehicle dynamics data, determine emotional state(s), and facilitate notification communication. It should be appreciated that one or more other applications 591 are envisioned.

The processor 572 may interface with the memory 578 to execute the operating system 579 and the set of applications 575. According to some embodiments, the memory 578 may also include other data 580 that may include any data (e.g., image profile data, vehicle dynamics data, location data, etc.) related to facilitating the functionalities as discussed herein. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 592. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 592, image data from a set of image sensors. For further example, the communication module 577 may transmit, via the network 592, generated logs to a remote server.

The electronic device 510 may further include a set of sensors 584. The processor 572 and the set of applications 575 may interface with the set of sensors 584 to retrieve and process the corresponding sensor data. The set of sensors 584 may include at least one of: a location module (e.g., a global positioning system (GPS) chip), image sensor, accelerometer, gyrosensor, force sensor, strain gauge, inclinometer, goniometer, ignition sensor, clock, speedometer, torque sensor, throttle position sensor, gyroscope, compass, yaw rate sensor, tilt sensor, steering angle sensor, brake sensor, and/or other sensors. The set of sensors may also be configured to detect various conditions of the vehicle operators, including various biometric information, movements, and/or the like. In one particular implementation, the operation assessment application 590 may use various data from the set of sensors 584 to facilitate certain functionalities.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer implemented method in an electronic device of assessing an emotional state of an operator of a vehicle, the method comprising:
   dynamically analyzing, by a processor, image data captured by one or more image sensors located within the vehicle, the image data depicting the operator of the vehicle, to identify a current behavior of the operator;
   comparing, by the processor, vehicle dynamics data associated with operation of the vehicle to baseline vehicle dynamics data to determine that the vehicle dynamics data differs from the baseline vehicle dynamics data; and
   in response to the comparing, determining, based on both the vehicle dynamics data and the identified current behavior of the operator, an inferred current emotional state of the operator.

2. The computer-implemented method of claim 1, further comprising:
   generating a log indicating the inferred current emotional state of the operator; and
   transmitting, via a network connection, the log to a server.

3. The computer-implemented method of claim 1, further comprising:
   determining, based on the inferred current emotional state, that the operator is not currently in an appropriate emotional state for operating the vehicle.

4. The computer-implemented method of claim 1, further comprising:
   generating a recommendation for the operator, the recommendation based on the inferred current emotional state; and
   presenting the recommendation in a user interface of the electronic device.

5. The computer-implemented method of claim 1, wherein analyzing, by the processor, the image data to identify the current behavior of the operator that is depicted in the image data comprises:
   accessing a set of baseline images depicting a plurality of exemplary movements, gestures, or positions;
   comparing, by the processor, the image data depicting the operator of the vehicle to the baseline images to identify a set of movements, gestures, or positions of the operator as depicted in the image data; and
   determining the current behavior of the operator based on the set of movements, gestures, or positions of the operator as depicted in the image data.

6. The computer-implemented method of claim 1, wherein the vehicle dynamics data associated with operation of the vehicle is captured by one or more vehicle dynamics sensors associated with the vehicle.

7. The computer-implemented method of claim 1, wherein comparing, by the processor, the vehicle dynamics data to the baseline vehicle dynamics data to determine that the vehicle dynamics data differs from the baseline vehicle dynamics data comprises:
   identifying, from the vehicle dynamics data, at least one vehicle dynamics data parameter and a vehicle dynamics data value thereof;
   identifying, from the baseline vehicle dynamics data, a baseline vehicle dynamics data value for the at least one vehicle dynamics data parameter;
   calculating a difference between the vehicle dynamics data value and the baseline vehicle dynamics data value; and
   determining that the difference exceeds a threshold amount.

8. The computer-implemented method of claim 7, wherein calculating the difference between the vehicle dynamics data value and the baseline vehicle dynamics data value comprises:
   calculating a percentage difference between the vehicle dynamics data value and the baseline vehicle dynamics data value; and
   wherein determining that the difference exceeds the threshold amount comprises determining that the percentage difference exceeds a percentage threshold amount.

9. The computer-implemented method of claim 1, wherein determining the inferred current emotional state of the operator comprises:
   accessing a database that associates a plurality of inferred emotional states with a plurality of operator behaviors; and
   determining, from the plurality of inferred emotional states, the inferred emotional state that matches the current behavior of the operator.

10. An electronic device configured to assess an emotional state of an operator of a vehicle, comprising:
    a transceiver configured to communicate data via at least one network connection;
    a memory configured to store non-transitory computer executable instructions and baseline vehicle dynamics data;
    a processor configured to interface with the transceiver and the memory, and configured to execute the non-transitory computer executable instructions to cause the processor to:
       dynamically analyze image data captured by one or more image sensors located within the vehicle, the image data depicting the operator of the vehicle, to identify a current behavior of the operator;
       compare vehicle dynamics data associated with operation of the vehicle to baseline vehicle dynamics data to determine that the vehicle dynamics data differs from the baseline vehicle dynamics data; and
       in response to the comparing, determine, based on both the vehicle dynamics data and the identified current behavior of the operator, an inferred current emotional state of the operator.

11. The electronic device of claim 10, wherein the computer executable instructions further cause the processor to:
    generate a log indicating the inferred current emotional state of the operator; and
    transmit, via the transceiver, the log to a server.

12. The electronic device of claim 10, wherein the computer executable instructions further cause the processor to:
    determine, based on the inferred current emotional state, that the operator is currently not in an appropriate emotional state for operating the vehicle.

13. The electronic device of claim 10, further comprising:
    a user interface;

wherein the computer executable instructions further cause the processor to:

generate a recommendation for the operator, the recommendation based on the inferred current emotional state; and cause the user interface to present the recommendation.

14. The electronic device of claim 10, wherein the memory further stores a set of baseline images depicting a plurality of exemplary movements, gestures, or positions, and wherein to analyze the image data to identify the current behavior of the operator that is depicted in the image data, the processor is configured to:

access the set of baseline images;

compare the image data depicting the operator of the vehicle to the set of baseline images to identify a set of movements, gestures, or positions of the operator as depicted in the image data; and determine the current behavior of the operator based on the set of movements, gestures, or positions of the operator as depicted in the image data.

15. The electronic device of claim 10, wherein the vehicle dynamics data associated with operation of the vehicle is captured by one or more vehicle dynamics sensors associated with the vehicle.

16. The electronic device of claim 10, wherein to compare vehicle dynamics data associated with operation of the vehicle to baseline vehicle dynamics data to determine that the vehicle dynamics data differs from the baseline vehicle dynamics data, the processor is configured to:

identify, from the vehicle dynamics data, at least one vehicle dynamics data parameter and a vehicle dynamics data value thereof;

identify, from the baseline vehicle dynamics data, a baseline vehicle dynamics data value for the at least one vehicle dynamics data parameter;

calculate a difference between the vehicle dynamics data value and the baseline vehicle dynamics data value; and determine that the difference exceeds a threshold amount.

17. The electronic device of claim 16, wherein to calculate the difference between the vehicle dynamics data value and the baseline vehicle dynamics data value, the processor is configured to:

calculate a percentage difference between the vehicle dynamics data value and the baseline vehicle dynamics data value, and determine that the percentage difference exceeds a percentage threshold amount.

18. The electronic device of claim 10, wherein the memory further associates a plurality of inferred emotional states with a plurality of operator behaviors, and wherein to determine the inferred current emotional state of the operator, the processor is configured to:

determine, from the plurality of inferred emotional states, the inferred emotional state that matches the current behavior of the operator.

19. A tangible, non-transitory computer-readable medium storing executable instructions for assessing an emotional state of an operator of a vehicle, that when executed by at least one processor of a computing device, cause the computing device to:

dynamically analyze image data captured by one or more image sensors located within the vehicle, the image data depicting the operator of the vehicle, to identify a current behavior of the operator;

compare vehicle dynamics data associated with operation of the vehicle to baseline vehicle dynamics data to determine that the vehicle dynamics data differs from the baseline vehicle dynamics data; and in response to the comparing, determine, based on both the vehicle dynamics data and the identified current behavior of the operator, an inferred current emotional state of the operator.

20. The tangible, non-transitory computer-readable medium of claim 19, wherein the instructions further cause the computing device to:

determine, based on the inferred current emotional state, that the operator is not currently in an appropriate emotional state for operating the vehicle.

* * * * *